April 25, 1950 R. M. WILMOTTE ET AL 2,505,316
PHOTOELECTRONIC LIMIT GAUGE
Filed April 10, 1947 3 Sheets-Sheet 2

Inventor
RAYMOND M. WILMOTTE
ROBERT E. BENEDICT
By Samuel J. Snyder
Attorney

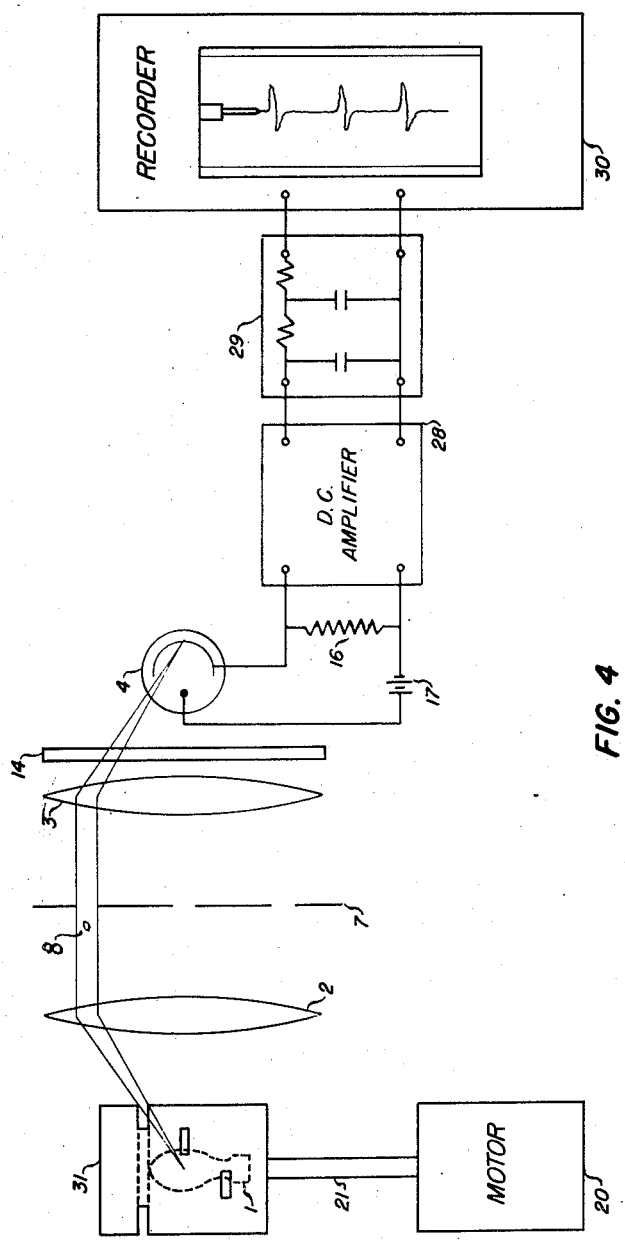

Patented Apr. 25, 1950

2,505,316

UNITED STATES PATENT OFFICE 2,505,316

PHOTOELECTRONIC LIMIT GAUGE

Raymond M. Wilmotte, Tarrytown, and Robert E. Benedict, New York, N. Y.; said Benedict assignor to said Wilmotte Application April 10, 1947, Serial No. 740,676

6 Claims. (Cl. 250—222)

This invention relates to an electronic micrometer for giving a substantially continuous and instantaneous measurement of an object which may be stationary or in rapid motion and to indicate whether the quantity lies within predetermined limits. This application is related to application S. N. 698,345 filed September 20, 1946, by Norman H. Taylor, now abandoned.

The invention disclosed in this application is an improvement of the electronic micrometer described in the above application. It is desirable in many production processes to obtain a permanent record of the measured quantity and it is one object of our invention to accomplish this result.

It is another object of our invention to record the average value instead of the instantaneous value of the quantity measured in order to provide a clear presentation of the trend of the production process, uncomplicated by unimportant momentary variations or electrical transients.

It is still another object of our invention to provide an improved scanning which will produce a succession of light beams without overlaps or gaps that give rise to transients which impair the sensitivity and accuracy of the measurements.

It is still another object of our invention to diffuse the light beams so that all will illuminate substantially the same extended area of the cathode of the photocell although the beams arrive at the cathode from different directions.

Another object of our invention is to avoid errors due to the use of a finite light source.

Figure 1:
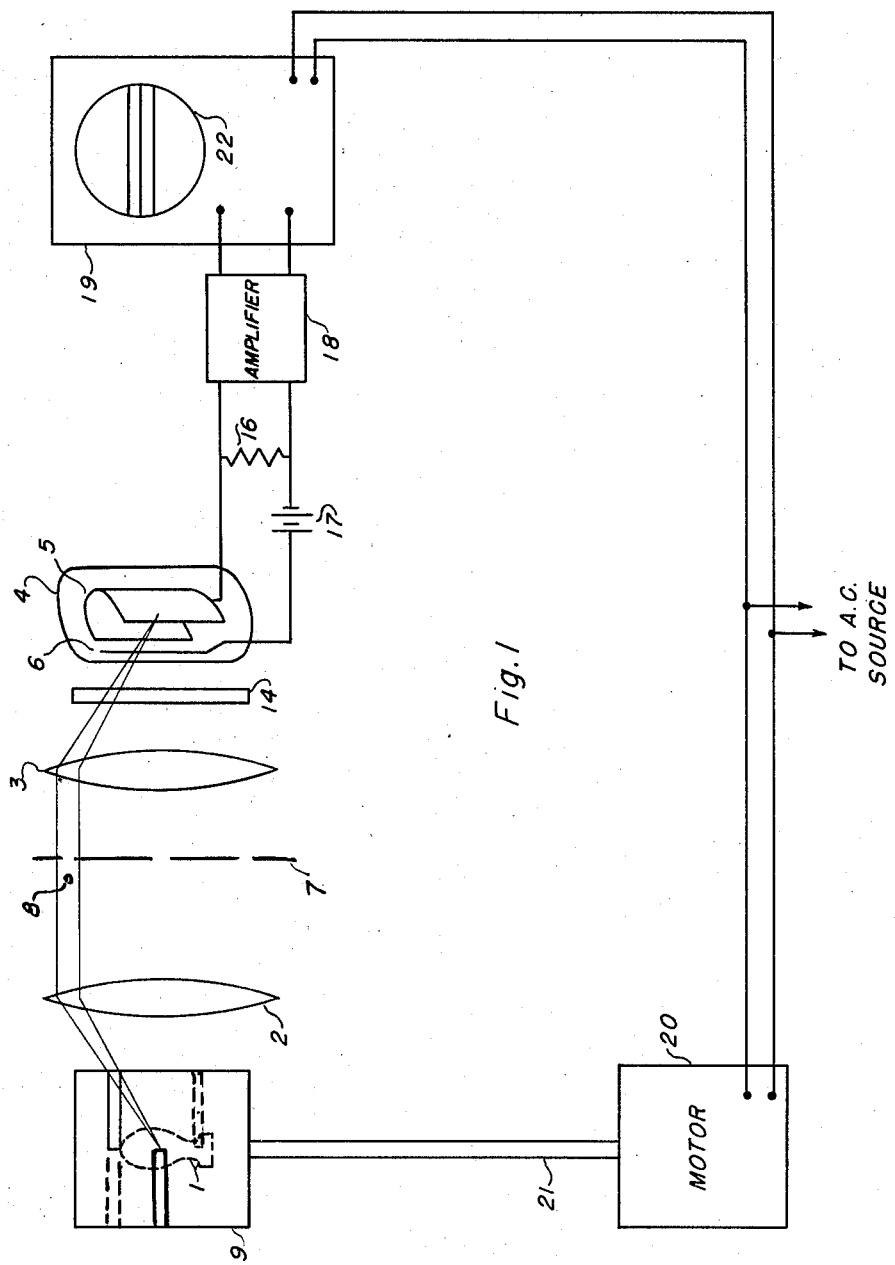
Figure 2:
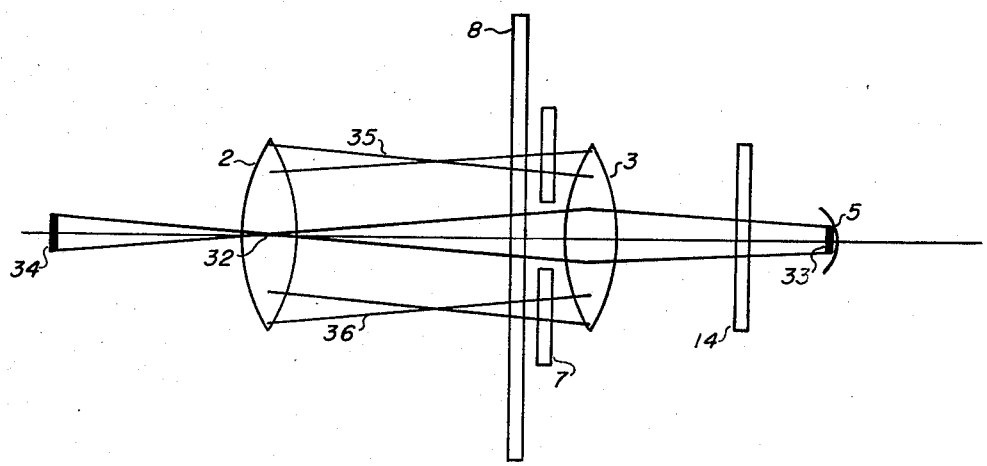
Figure 3:
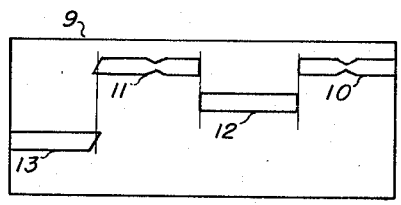

The invention will be more fully understood from the following description and drawing in which:

Fig. 1 is a schematic illustration of one embodiment of our invention showing various novel features thereof, Fig. 2 is a diagram showing the optical system utilized to avoid errors due to the finite light source, Fig. 3 is a view showing a development of the scanning drum, and Fig. 4 is a schematic view showing a modification of the apparatus shown in Figure 1.

Referring to the drawing, there is shown a lamp 1, a collimating lens 2, producing a beam of light falling on another lens 3. A photocell 4 is placed so that the cathode 5 is at the focal point of lens 3. Likewise the lamp 1 is at the focal point of the lens 2. Between the lenses 2 and 3 is an apertured screen 7. The object 8 to be measured is placed so as to be framed by one of the apertures of the screen 7. A rotationg drum 9 surrounds the lamp 1. The drum 9 is circumferentially slotted so that a beam of light will be transmitted at all times through one and only one of the apertures of the screen 7. The drum 9 will be described in more detail with reference to Figure 3.

Between the lens 3 and the cathode 5 a transparent diffuser 14 is placed. By virtue of the voltage source 17a voltage is developed across an impedance 16 corresponding to the amount of light reaching the cathode 5. The voltage across the impedance 16 is amplified by an amplifier 18 and impressed on the vertical plates of an oscilloscope 19. The drum 9 is rotated by a motor 20 through a shaft 21. The motor 20 is energized from an A. C. source which is also connected to the horizontal plates of the oscilloscope to provide a horizontal sweep. The speed of the motor is chosen so that a separate sweep will be provided for each beam of light produced by the scanning drum 9. For example the motor may rotate at a speed of 1800 R. P. M. and the scanning drum may have four 90 degree slots, as shown in Figure 3, while the A. C. source has a frequency of 60 C. P. S.

The rotation of the drum 9 sequentially illuminates the apertures of the screen 7 in the following order: first, the upper test aperture, secondly, the middle aperture which may represent the upper limit, thirdly, the upper aperture again, and lastly the lowest aperture which may represent the lower limit. The apertures can be adjusted in width by any suitable means, such as the micrometer operated shutters shown in application S. N. 698,345 mentioned above. In setting up the apparatus for operation all three apertures are first made the same size by adjusting them so that the three traces they produce on the cathode ray tube coincide. Then the test aperture is opened a distance equal to the size of the object. The lower limit aperture is opened and the upper limit aperture is closed by an amount equal to the minus and plus tolerances, respectively.

The rotation of the drum 9 then causes illumination of the cathode 5 through the three apertures. The amount of light on the cathode 5 determines the height of the horizontal traces on the oscilloscope, the middle trace, generally, representing the size of the object and the upper and lower traces representing the limits. The test trace is distinguishable because it is twice as intense as the limit traces and can be further identified by kinking it by means of a notch in the slots 10 and 11 of the drum 9. When the size of the object deviates, the test trace will approach or pass beyond the limit traces. We have operated the oscilloscope so that a one inch deflection on the cathode ray tube represents 0.001 inch in the dimension of the object being measured, so that deviations of 0.0001 are readily discernible. The measured object may move during measurement without causing errors, provided its shadow falls within the test aperture.

In order to avoid errors the same light source, photocell, amplifier and indicator must be used to measure the light through all three apertures. This is obviously the case in our apparatus. Any variation in any component of our apparatus will affect all three traces in the same manner, and not change their relative positions. This is an extremely important feature of our apparatus.

A diffuser 14 is used to avoid burning a spot on the photocell, that is illuminating one spot so intensely that it has a short life. It is the practice to place a diffuser in front of a photocell and focus the light on the diffuser. We have made the discovery that to avoid errors the light from the several apertures must be focused on a point on the cathode 5 of the photocell through the diffuser. We believe the explanation of this phenomenon is, first, that substantially the same area of the photocell must be used for the light from all three apertures because not all areas of the photocell are equally sensitive at all times during its life. Secondly the diffuser diffuses each ray into a cone of light whose axis is an extension of the ray of light. Thus each ray of light, from whatever angle it arrives, forms an area of light around the focal point on the cathode of the photocell. If the light is focused on the diffuser, as customary, rays arriving at different angles will be diffused over different areas of the photocell cathode. We have found that it is essential to the obtainment of high accuracy to depart from the usual practice and place the diffuser and photocell as described.

Referring to Fig. 2 a finite light source is shown at 34. Through the lens 2 the lowest point of the light source will produce a beam parallel to the ray from said point through the center 32 of the lens 2. The lowermost ray of this beam transmitted through the lens 2 is indicated at 36. Similarly the ray 35 is the uppermost ray of the beam transmitted through the lens 2 from the highest point of the light source 34. It can be seen that if the light source 34 has a finite extent it will produce diverging beams even though it is placed at the focus of the lens 2. Consequently an object placed outside of the rays 35 and 36 will not intercept as much light as it would if placed between the rays 35 and 36. Hence in any system in which the size of the object is determined by the amount of light it intercepts an error would be produced if the object moved past the ray 35 or 36. In order to avoid such errors we have confined all the apertures of the screen 7 between the rays 35 and 36. The image 33 of the light source 34 is focused on the cathode 5 by the lens 3. It will be evident that as long as the shadow of the object 8 to be measured remains within the confines of the test aperture the amount of light blocked from the cathode 5 remains invariant when the object 8 moves along or across the light beam a small distance, even though the entire light beam is not uniform and does not consist of parallel rays only. This result will be obtained if the lens 3 is large enough to intercept all rays passing through the several apertures of the screen.

Figure 3 shows the side of the scanning drum 9 laid out as a flat sheet. The drum has four slots 10, 11, 12 and 13. These slots are each 90 degrees long and the slots 10 and 11 may be notched to produce an identification mark on the oscilloscope test traces. They are cut so that slot 10 will permit the uppermost test aperture of the screen 7 to be illuminated and then the middle aperture, without interruption or overlapping. After this the test aperture will again be illuminated through the slot 11, followed by the illumination of the lowest aperture of the screen 7 through the slot 13. The slots of the drum may have vertical ends, with the end of one slot lying on the same vertical line as the beginning of the next slot. Alternatively the ends of the slots may be inclined to the vertical with the center of the inclined ends of consecutive slots lying on the same vertical line. This construction is shown at the end of slot 11 and the beginning of slot 13.

Figure 4 shows a modification of the system disclosed in Fig. 1 which provides a permanent record of the average value of the measured quantity with respect to the predetermined limits. The optical system in Fig. 4 is the same as that in Fig. 1 except for the scanning drum. The scanning drum 31 of Fig. 4 could be the same as the drum 9 of Fig. 1 but we prefer to use a drum which will scan the object to be measured for about 300 degrees of the drum and scan each of the limit apertures for about 30 degrees of the drum. These different scanning periods enable the test recordings to be distinguished from the limit recordings. Also in this modification we rotate the drum at a much lower speed, for example, less than one cycle per second. The response of the photocell 4 is again developed across the impedance 16 and passed through a D. C. amplifier 28. The output of the amplifier 28 is averaged by an integrating circuit or device 29 and impressed on a recorder 30. The recorder is an ink recorder of the type manufactured by the Esterline Angus Company. In this recorder the pen is actuated by the impressed signal and the chart is driven at a constant speed by a motor within the recorder. There is of course no necessity for synchronizing the recorder with the rotation of the drum 31. The indications on the chart will appear as shown in Fig. 4. This system produces a permanent record of the magnitude of the object measured averaged over a substantial portion of the period during which each aperture of screen 7 is scanned. Further, the averaging circuit or device 29 absorbs electrical transients and rapid fluctuations of the signal which would complicate the record. As a consequence, a clean record of the trend of the magnitude of the object in relation to the desired upper and lower limits is obtained.

The discoveries we have made and incorporated in the embodiments of our invention disclosed herein permit great accuracy, stability, and readability of rapid measurements under production line conditions. Many variations of our invention will be apparent to any one skilled in this art. For example, the voltage source 17 in Fig. 4 may be alternating instead of direct and have an audio frequency and the output of the amplifier rectified before being applied to the integrating circuit. The scope of our invention is therefore not limited except by the prior art and the following claims.

We claim:

1. Apparatus for comparing the size of an object with predetermined upper and lower limits of said size, comprising a lamp, a photocell, means for focusing the light from the lamp on the cathode of the photocell, an opaque screen interposed between the lamp and the photocell, an aperture in said screen whose effective area is determined by the size of the object and two additional apertures corresponding to the said upper and lower limits of the size of the object respectively, a scanning drum surrounding the lamp and having staggered circumferential slots, means for rotating the drum so that the three apertures of the opaque screen are successively illuminated through the slots of the drum, a transparent diffuser in the path of the light and near the photocell, and means for continuously indicating the amount of light transmitted through each aperture.

2. Apparatus for comparing the size of an object with predetermined upper and lower limits of said size, comprising a lamp, a photocell, a transparent diffuser adjacent the photocell, means for generating three successive light beams and focusing said beams on the cathode of the photocell through the diffuser, means for causing the area of one of said light beams to correspond to the size of the object and the areas of the other two light beams to correspond to the upper and lower limits of the size of the object, and means for indicating the response of the photocell to each of the light beams.

3. The apparatus defined in claim 2 including means for distinctively marking the indications of the size of object.

4. In a photoelectric system, a collimating lens, a finite light source at the focus of the lens, a photocell, a second lens for concentrating the light from the collimating lens on the photocell, a screen having a plurality of apertures at different distances from the exis of the collimating lens but lying entirely within a region illuminated by every point of the light source, and the second lens being large enough to intercept every ray of light from said source passing through said apertures, whereby the amount of light prevented from reaching the photocell by an object framed by one of said apertures is invariant with movement of the object across or along the beams of light, and means for diffusing the light reaching said photocell from said second lens.

5. Apparatus for comparing the size of an object with a predetermined limit of said size, comprising a lamp, a photocell, a light diffuser means for generating two alternate light beams, and focusing said beams on the cathode of the photocell through said light diffuser, means for causing the area of one of the light beams to correspond to a magnitude of an object and the area of the other beam to correspond to a predetermined limit of said magnitude, means for amplifying the responses of said photocell, and an indicator connected to said last named means.

6. The apparatus defined in claim 5 including means for distinguishing the recording of the magnitude of the object from the recording of the predetermined limit of the magnitude.

RAYMOND M. WILMOTTE.
ROBERT E. BENEDICT.

REFERENCES CITED

The following references are of record in the file of this patent:

UNITED STATES PATENTS

| Number | Name | Date |
|---|---|---|
| 2,177,133 | Desch | Oct. 24, 1939 |